(12) United States Patent
Perez Gutierrez

(10) Patent No.: US 11,981,504 B2
(45) Date of Patent: May 14, 2024

(54) CONTAINER WITH BUILT-IN POT

(71) Applicant: CREATING IDEAS S.A.S., Bogota D.C. (CO)

(72) Inventor: Mario Ernesto Perez Gutierrez, Bogota (CO)

(73) Assignee: CREATING IDEAS S.A.S., Bogota D.C. (CO)

(*) Notice: Subject to any disclaimer, the term of this patent is extended or adjusted under 35 U.S.C. 154(b) by 385 days.

(21) Appl. No.: 17/368,854

(22) Filed: Jul. 7, 2021

(65) Prior Publication Data

US 2022/0009708 A1 Jan. 13, 2022

(30) Foreign Application Priority Data

Jul. 7, 2020 (CO) .............................. 2020/0008369

(51) Int. Cl.
*B65F 1/14* (2006.01)
*A01G 9/02* (2018.01)

(52) U.S. Cl.
CPC .............. *B65F 1/1436* (2013.01); *A01G 9/02* (2013.01); *B65F 2210/135* (2013.01)

(58) Field of Classification Search
CPC ...... B65F 1/1623; B65F 1/163; B65F 1/1436; B65F 1/1426; B65F 1/14; B65F 2210/135; B65F 2210/00; A01G 9/022; A01G 9/02; B65D 43/26; B65D 21/0201; A47F 7/0078; A47F 7/00
USPC .......... 220/23.4, 23.2, 264, 263, 262, 908.1, 220/908; 211/85.18, 85.19, 85.23, 71.01
See application file for complete search history.

(56) References Cited

U.S. PATENT DOCUMENTS

| | | | | |
|---|---|---|---|---|
| 3,407,941 A | * | 10/1968 | Schmidt ................ | B65F 1/1426 312/258 |
| 3,510,055 A | * | 5/1970 | Safford ................. | B65F 1/1426 312/211 |
| 4,930,653 A | * | 6/1990 | Machado ............... | B65F 1/1426 D34/10 |
| 5,044,644 A | * | 9/1991 | Duran ...................... | B62B 3/10 280/47.35 |
| 7,922,023 B2 | * | 4/2011 | Dommerholt ............ | B65F 1/10 220/252 |
| 2007/0068942 A1 | * | 3/2007 | Smudde .................. | B65F 1/163 220/23.86 |

FOREIGN PATENT DOCUMENTS

| | | |
|---|---|---|
| CN | 2322943 Y | 6/1999 |
| CN | 201330047 Y | 10/2009 |
| CN | 201501651 U | 6/2010 |
| CN | 202340504 U | 7/2012 |
| CN | 104291042 A | 1/2015 |
| CN | 108839981 A * | 11/2018 ................ B65F 1/14 |

(Continued)

*Primary Examiner* — Robert J Hicks
(74) *Attorney, Agent, or Firm* — Hoglund & Pamias, PSC; Roberto J. Rios

(57) ABSTRACT

The present invention belongs to the field of various industrial techniques related to the storage of thin or threadlike materials, that is, with the collection or removal of household garbage or similar waste, and more specifically it relates to a garbage receptacle. The invention is a container that integrates a garbage can to store waste and waste generated in the environment and a flowerpot to beautify the environment.

19 Claims, 6 Drawing Sheets

(56) References Cited

FOREIGN PATENT DOCUMENTS

| | | | | |
|---|---|---|---|---|
| CN | 109095038 A | * | 12/2018 | ............ B65F 1/1405 |
| DE | 4340897 A1 | * | 6/1995 | .............. B65F 1/006 |
| DE | 20008583 U1 | * | 8/2000 | ............ B65F 1/1436 |
| EP | 979784 A1 | * | 2/2000 | .............. B65F 1/006 |
| KR | 860002739 Y1 | * | 10/1986 | ................ B65F 1/14 |
| WO | WO-9532134 A1 | * | 11/1995 | ............ B65F 1/1426 |

* cited by examiner

CONTAINER WITH BUILT-IN POT

TECHNOLOGY SECTOR

The present invention belongs to the field of various industrial techniques related to the storage of thin or thread-like materials, that is, with the collection or removal of household garbage or similar waste, and more specifically it relates to a garbage receptacle. The invention is a container that integrates a garbage can to store waste and waste generated in the environment and a flowerpot to beautify the environment.

STATE OF THE ART

There is the patent application No. CN104291042 "CLASSIFICATION OF ENVIRONMENTALLY FRIENDLY GARBAGE BOTTLE POT", dated Jan. 21, 2015, whose owner is CHEN XIANGFENG, describes a classification of an environmentally friendly garbage can. The environmental friendly flower pot dustbin classification comprises a dustbin body (1), a flowerpot box (2), a pebble water filter layer (3), a geotextile (4), a pot drain opening (5), pot legs (6), a feed opening (7) for contaminants like batteries, a box door (8) for contaminated trash like batteries, a general trash feed opening (9), a general garbage box door (10), a garbage drain opening (11), a garbage can sewer box (12), a garbage can sewer box spill hole (13), a sewer box holding opening (14), planting soil (15), plants (16), garbage can legs (17), a box (18) for contaminated garbage such as batteries and a pot bundle (19). The environmentally friendly garbage can classification of the flowerpot has the beneficial effects that the structure is adopted, contaminated waste products and pollution-free waste products can be collected in a classification mode, can be achieved the goal of pollution-free classification treatment and the function of integrating environmental beautification and garbage storage is achieved through flower and ornamental plants. In contrast, the new invention has a foot pedal on both the front and rear of the garbage container, which allows the garbage can to be tilted within a 180° angle for garbage reception and removal. In addition, it has a container on one of its sides, which can be used to contain a cleaning tool.

Also known in the state of the art is patent application No. CN2322943 "POT TYPE GARBAGE CAN", dated Jul. 21, 2009, whose owner is WANG YIGANG, refers to a flowerpot type garbage can. The utility model is a novel environmental sanitation device that combines the flowerpot and the trash can in integration. The utility model is structured as having a box body, a box door, and a waste inlet. The utility model is characterized in that it is provided with an integrated pot, a built-in waste collection barrel or a mobile ring frame; the upper end of the box body is provided with the built-in flowerpot, the inner part of the box body is provided with the built-in waste collection barrel, or the inner wall of the box body is fixed with the ring movable frame. The bottom of the built-in pot is provided with a convex water flow guide plate. The bottom of the built-in waste collection barrel is semi-circular. The pot-type garbage can be used as a flowerpot and has the efficacy of garbage. The utility model is a multi-functional object, the urban landscape can be beautified, and the environment can be beautified. In contrast, in the new invention, the garbage can is tilted to the sides allowing easy removal of garbage and improving access to deposit the waste, allowing a wider space for the entry of garbage.

In the state of the art, patent application No. CN201330047 "GARBAGE BUCKET WITH POT", dated Oct. 21, 2009, whose owner is XINJIAN XIAO, refers to a garbage can with a flowerpot. The garbage container comprises a container body for containing garbage, a flowerpot is arranged on the upper part of the container body, the upper part of the container body is equipped with an inlet for littering, and the lower part of the container body provided with a garbage disposal port with a door. The garbage container with a flowerpot has a novel structure, it can realize multiple uses through a container, and it can decorate the environment with flowers and plants planted in the flowerpot that is arranged in the upper part of the container body and has the function common to exist garbage containers. Compared with the prior art, the utility model has the advantages of novel appearance, low production cost, convenience, utility, room decoration, and the like. In contrast, the new invention has a mechanism for draining the water deposited in the pot, it also has an additional accessory, which refers to a container located on one of its sides which contains a cleaning tool that facilitates garbage collection.

Also known is the patent application No. CN201501651 "POT GARBAGE CAN", dated Jun. 9, 2010, whose owner is CONGXI GUO. The utility model refers to a flowerpot garbage can, in which the section cross section of the pot trash can is circular. The pot trash can is divided into a pot and a can body by a partition board perpendicular to the bottom surface of the pot trash, a plurality of through grooves are arranged in the partition board and sealed to through permeable layers, and the can body is provided with a can cap that matches and seals the can body. Preferably, the partition board is shaped like an 'L', correspondingly, the pot and the body of the can are fan-shaped, the height of the body of the can is higher than that of the pot, and the radius of the body of the can is larger than that of the pot. The flowerpot trash can have the advantages that the flowerpot trash can has a simple structure, integrates the functions of planting pot flowers and storing trash can, and conducts useful substances generated by fermentation of trash inside the trash can to penetrate the soil of the pot to be used as food for the plants in the pot. In contrast, in the new invention, the flowerpot is located in the upper part of the container, which does not interfere when removing and depositing the garbage in the corresponding pot. In addition, within its applications, several containers can be organized together, integrating up to three pots of trash with one or more pots.

On the other hand, there is the patent application No. CN202340504 "Flowerpot with trash can function", dated Jul. 25, 2012, whose owner is XINGMING YAO, it is related to the technical field of flowerpots and is particularly related to a flowerpot that has the function of a trash can. The pot having the function of a trash can comprises a pot body and a lid body; the body of the pot comprises a planting area and a fermentation area; a fixed partition board is arranged between the planting area and the fermentation area; a passage that allows the planting area and the fermentation area to communicate with each other is arranged in the lower part of the fixed partition board; a base plate with a hole is fixedly arranged in the planting area and in a position near the bottom of the pot body; and the cover body is arranged in the opening part of the fermentation area. By adopting the integrated structure, kitchen waste can be converted into necessary fertilizer for plants directly and conveniently after being fermented; the flowerpot that has the function of a trash can is simple and practical in structure and helps to beautify the environment; Furthermore, no secondary pollution is generated, and the waste produced every day is not necessarily absorbed if the waste can support plant growth through the meshes. In contrast, the new invention has a channel that runs through the structure of the container with a built-in pot, which serves to drain the water from the pot, preventing it from suffocating with stagnant water.

DESCRIPTION OF THE INVENTION

The attached figures illustrate the scope that the invention is proposed within the following proposal for the container with a built-in pot:

Figure 1:
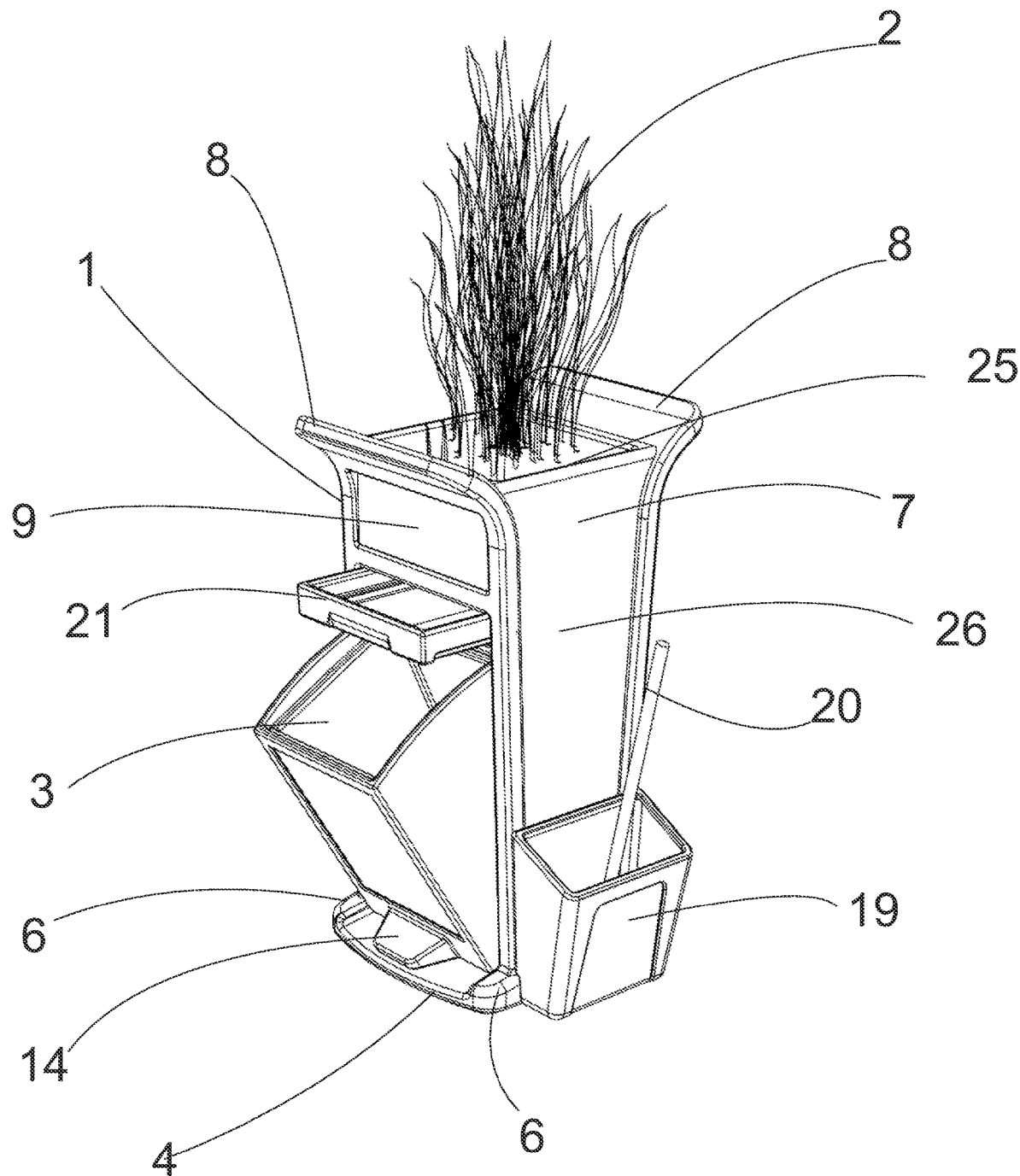
FIG. 1 shows a perspective of container with incorporated pot.
Figure 2:
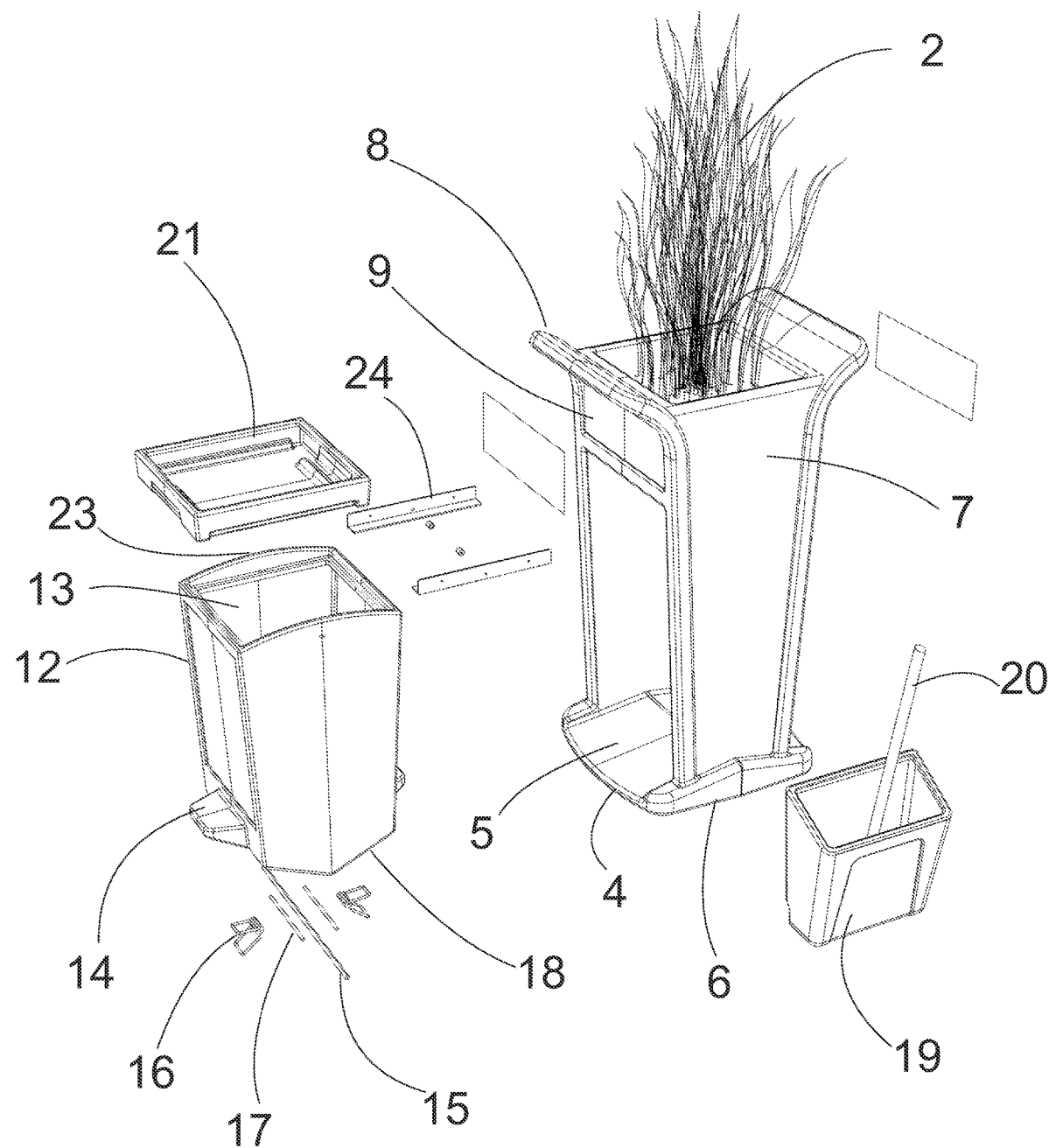
FIG. 2 shows the exploded view of the parts of container with incorporated pot.
Figure 3:
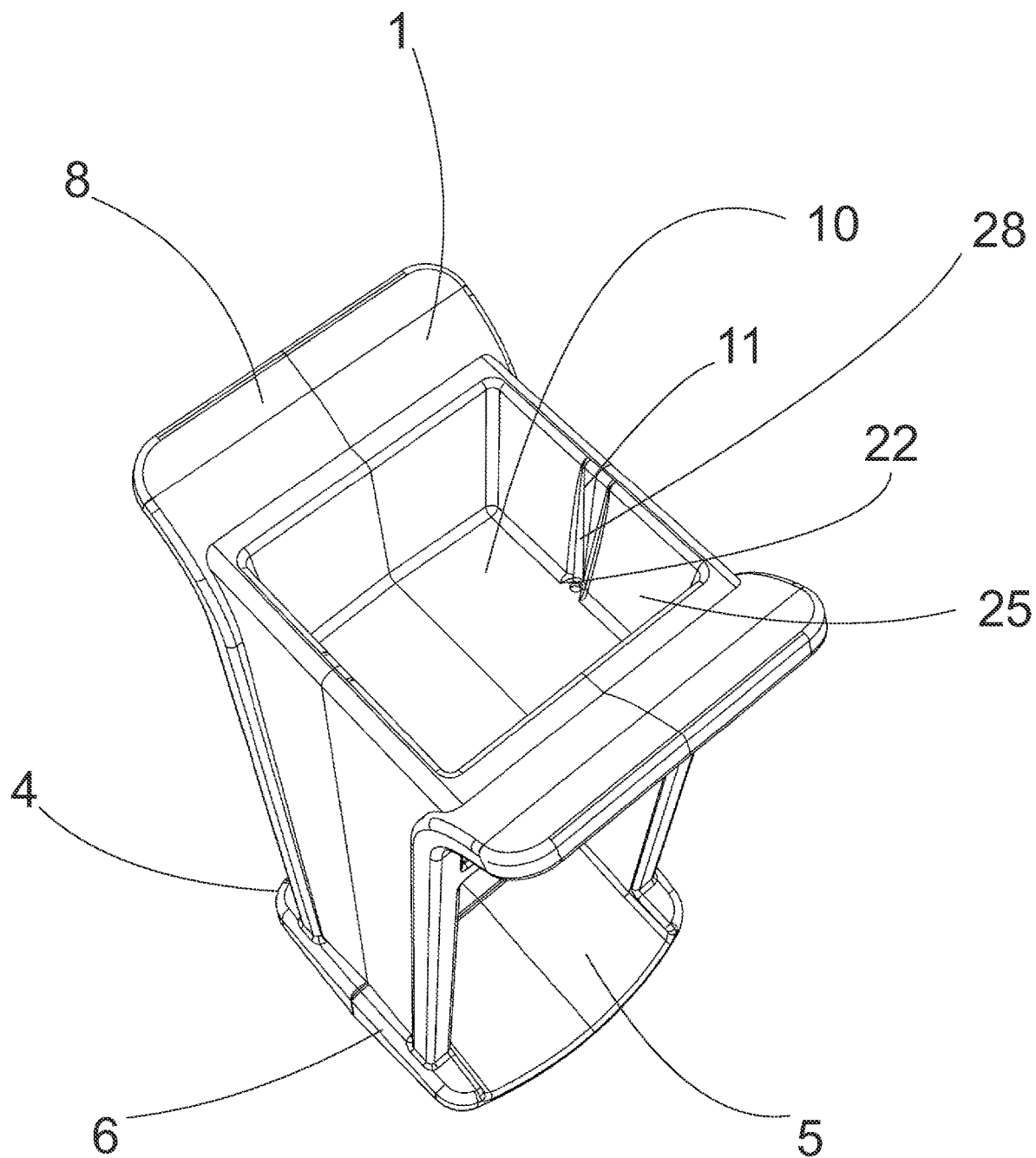
FIG. 3 shows the structure of container with incorporated pot.
Figure 4:
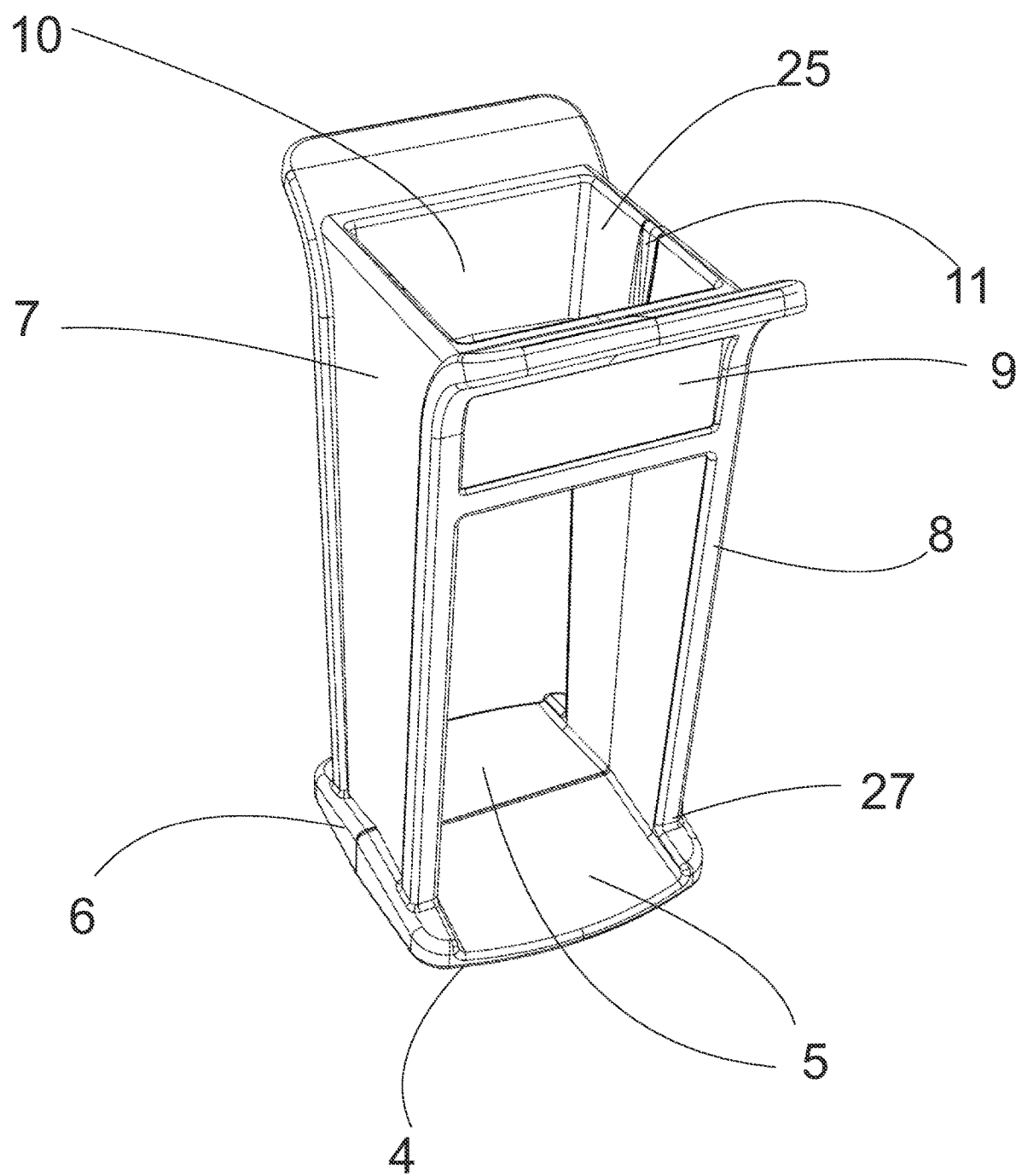
FIG. 4 shows a top view of container with incorporated pot where the cavity of the pot can be seen.
Figure 5:
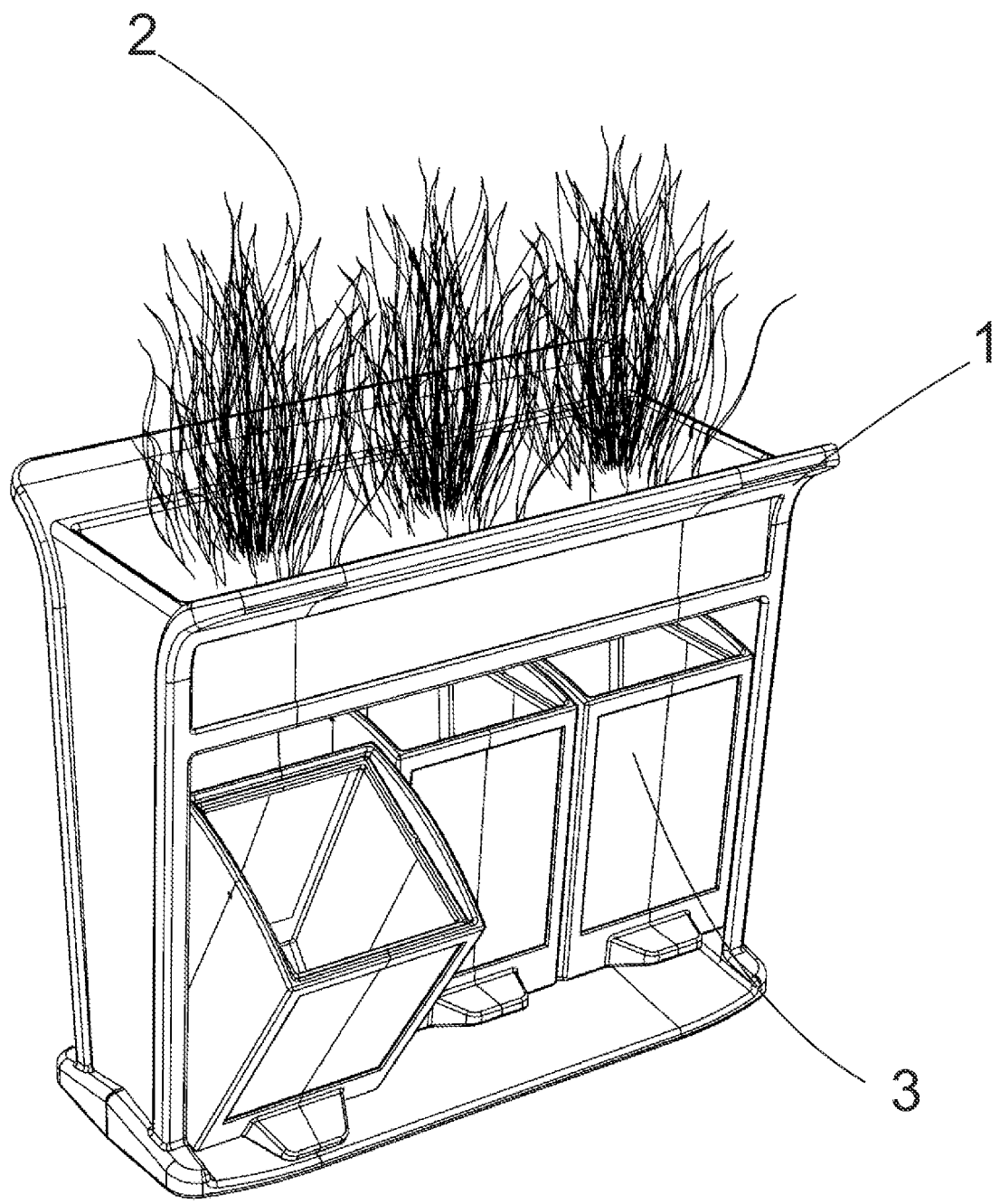
FIG. 5 shows container with incorporated pot with three built-in trash cans.

The container with built-in pot is made up of three parts: the structure (1), the pot (2) and the bin (3) which are integrated to give functionality to the development, which aims to provide a pleasant space increasing the effect of beautification in the environment where it is located and in the same way, to store the garbage product of the waste generated daily by people.

The structure (1) has the shape of a rectangular prism which is hollow in the center, which is the place where the bin (3) is located, which stores the deposited garbage. This hollow space allows the can (3) to move in a parabolic way up to 45° on each side.

The structure (1) is made up of a pedestal (4) that has two ramps (5) that allow the movement of the bin (3) from one side to the other within a 180° angle; two supports (6) located on the sides of the pedestal (4) which give stability to the container with incorporated pot; two side walls (7); and two side frames (8) that frame the front and rear view of the bin (3).

The side frames (8) have a rectangular slit (9) which can be used for advertising, signs, messages or any type of notice depending on the purpose and location of the container.

In the front part of the structure (1) there is a tray (21) located below the rectangular slit (9), which moves horizontally through a rail (24) and serves as a receptacle for objects according to use. container with built-in pot. In other embodiments of the invention, this tray (21) is optional for container design.

On one of the side walls (7) of the structure (1) a container (19) is located that can contain a cleaning tool (20) such as a mop, broom, brush, among others, which are useful to facilitate cleaning. cleaning the area where the container with built-in pot is located.

The pot (2) is housed in the cavity (10) that is located in the upper part (25) of the structure (1), where the cavity (10) has a channel (11) for draining the water received by the plants, in this way the stagnant water does not remain in the upper part, but rather dares the hole (22) that the channel (11) has, it moves through internally vertically through gravity one of the side walls (7) until get to the pedestal (4) of the frame (1).

The container with a built-in pot is unique as it has a conduit (28) made up of three sections for the drainage of stagnant water in the pot (2), the first section begins at the top (25) of the structure (1) with a channel (11) which serves as a means to transport the water. In the second section, this channel (11) passes through a hole (22) and connects with a pipe embedded within the side wall (7) located in the middle part (26) of the structure (1) and in the third section, the water comes out through a hole in the base of the pedestal (4) located in the lower part (27) of the structure (1).

The bin (3) is made up of a base (18) and a frame (12) that is shaped like an arch (23) on the top of two of its sides, where inside the frame (12) is the can garbage (13) where all waste is stored.

In the lower part of the frame (12) of the bin (3) a pedal (14) is located both on the front and back of the trash can (13), which when stepped on allows the oscillatory movement of the bin (3) to facilitate the deposit of waste and return to its initial location. This movement is actuated by a spring with lever (16) located under the base (18) of the bin (3) through a thin rod (17) that is inserted into the base (18) and performs the oscillatory movement of the drum (3) on the pivot shaft (15).

When the pedal (14) is depressed, the bin (3) moves parabolically towards the direction of the pedal (14), leaving the base (18) of the bin (3) located parallel to the ramp (5) of the pedestal (4).

The bin (3) is assembled to the structure (1) by means of a pivot shaft (15) that is supported in the lower part of the side walls (7), passing through the central base of the bin (3) that It fulfills the function of longitudinal pivot located in the center of the base (18) of the bin (3), so that said bin (3) oscillates when the pedal (14) is operated.

In one of the embodiments of the invention, the structure (1) can receive three or more cans (3) for the deposit of garbage which can be of different colors related to the type of waste to be deposited, facilitating the process recycling of these wastes and in the upper part, also housing three flowerpots (2) that beautify the environment.

Figure 6:
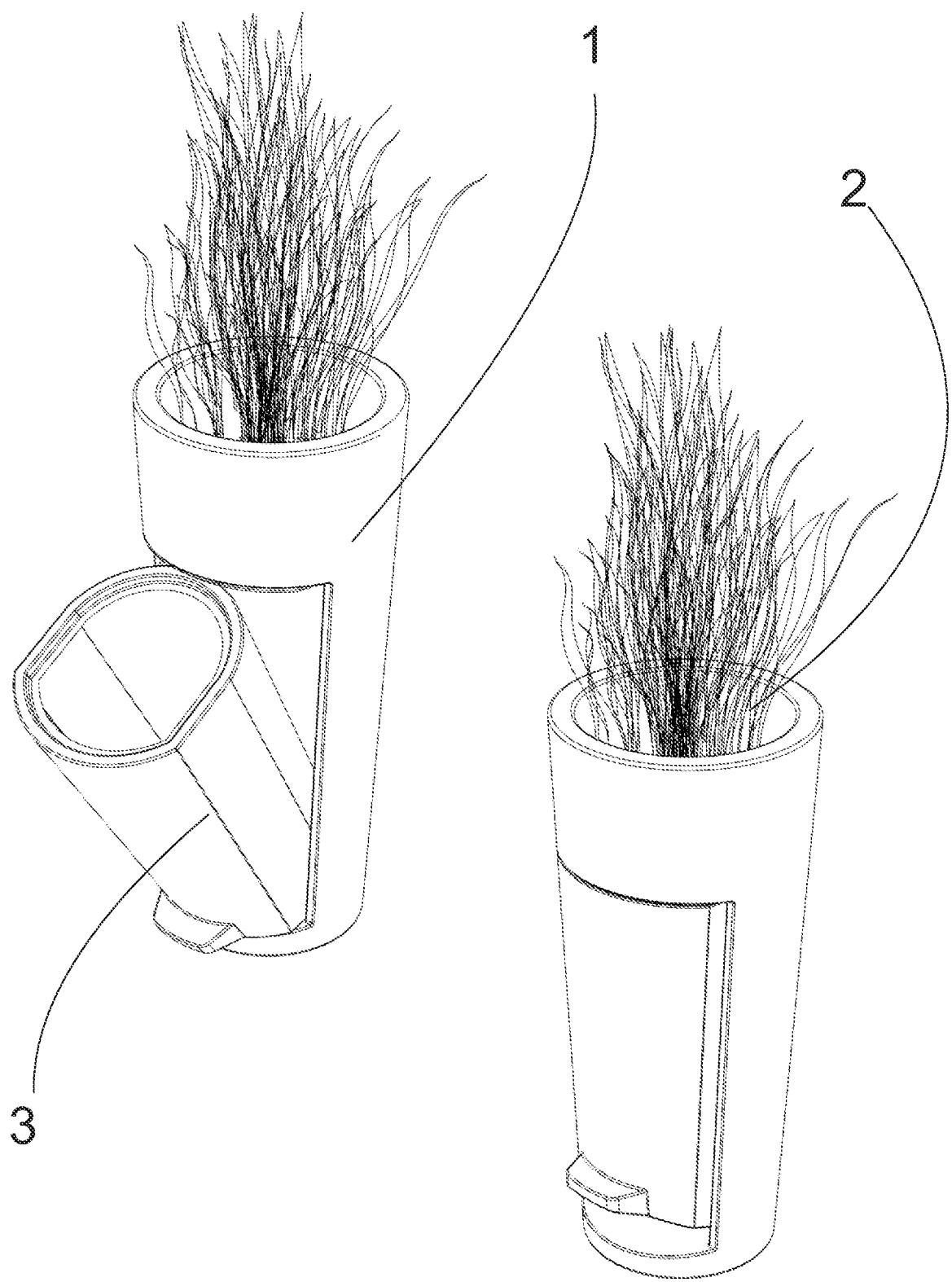
FIG. 6 shows the pot container incorporated in a cylindrical embodiment.

FIG. 6 shows an embodiment of the invention where the front and rear walls of the bin (3) can be curved, therefore, the structure (1) adopts a cylindrical shape, and the pot (2) has a cavity (10) circular.

The invention claimed is:

1. A container with incorporated pot comprising:
   a structure (1) comprising a pedestal (4) that supports the container with respective supports (6) located on the sides of the pedestal (4) with two side walls (7) and two side frames (8) that frame a front and rear view of a bin (3);
   the bin (3) made up of a frame (12) configured to contain inside a trash can (13), a pedal (14) and two springs with levers (16), both on a front and back of the trash can (13), respectively, said bin (3) is coupled to a pivot shaft (15) that generates oscillatory movement of the bin (3); and
   a pot (2) located inside a cavity (10) provided in an upper part (25) of the structure (1), wherein a first section of a conduit (28) is located in said upper part (25) and is formed by a channel (11) that passes to a second section of the conduit (28) through a hole (22) connected to an embedded pipe where it ends in a third section of the conduit (28) with a perforation in a base of the pedestal (4) located in a lower part (27) of the structure (1).

2. The container with incorporated pot according to claim 1, wherein the pedestal (4) has two ramps (5) that allow the bin (3) to oscillate from side to side within a 180° angle.

3. The container with incorporated pot according to claim 1, further comprising a container (19) located on one of the side walls (7) of the structure (1).

4. The container with incorporated pot according to claim 1, wherein said channel (11) is provided in said cavity (10) and connects to said embedded pipe that runs along and through one of the side walls (7) longitudinally up to the pedestal (4) of the structure (1).

5. The container with incorporated pot according to claim 1, wherein the two side frames (8) have a rectangular slit (9).

6. The container with incorporated pot according to claim 1, wherein the container (19) is configured to contain a cleaning tool (20).

7. The container with incorporated pot according to claim 1, wherein the pivot shaft (15) passes through a central base of the bin (3).

8. The container with incorporated pot according to claim 1, wherein the bin (3) has curved walls, the structure (1) is cylindrical, and the cavity (10) of the pot (2) is circular.

9. The container with incorporated pot according to claim 1, further comprising a tray (21) configured as a receptacle for objects.

10. The container with incorporated pot according to claim 9, wherein the tray (21) moves horizontally through a rail (24).

11. The container with incorporated pot according to claim 5, further comprising a tray (21) configured as a receptacle for objects, said tray (21) being provided below the rectangular slit (9).

12. The container with incorporated pot according to claim 1, further comprising a plurality of said bins (3).

13. The container with incorporated pot according to claim 12, further comprising a plurality of said pots (2).

14. The container with incorporated pot according to claim 1, further comprising three or more of said bins (3).

15. The container with incorporated pot according to claim 14, further comprising three or more of said pots (2).

16. The container with incorporated pot according to claim 1, wherein said frame (12) has an arch (23) on the top of two of its sides.

17. The container with incorporated pot according to claim 1, wherein the structure (1) is hollow in the center.

18. The container with incorporated pot according to claim 1, wherein the bin (3) is located inside said structure (1).

19. The container with incorporated pot according to claim 1, wherein said bin (3) moves in a parabolic way up to 45° on each side of the structure (1).

* * * * *